United States Patent [19]
Luedtke et al.

[11] 4,129,874
[45] Dec. 12, 1978

[54] ANTENNA PATTERN COMBINER

[75] Inventors: Arthur Luedtke, Marietta; William F. Bentley, Smyrna, both of Ga.

[73] Assignee: The United States of America as represented by the Field Operations Bureau of the Federal Communications Commission, Washington, D.C.

[21] Appl. No.: 834,203

[22] Filed: Sep. 19, 1977

[51] Int. Cl.² .......................... H01Q 3/26; G01S 5/04
[52] U.S. Cl. .................................... 343/854; 343/120; 343/876
[58] Field of Search ............... 343/119, 120, 121, 713, 343/854, 876

[56]  References Cited
U.S. PATENT DOCUMENTS 3,521,284  7/1970  Shelton et al. ...................... 343/727

Primary Examiner—Eli Lieberman
Attorney, Agent, or Firm—Wm. Ferrel Bentley

[57]  ABSTRACT

A three input device which accepts signals from a two port antenna system having opposing cardioid patterns, and a third input for a figure eight pattern that is at right angles to the first cardioids. The first antennas cardioids are combined by a zero-phase hybrid combiner into an omnidirectional pattern. This omnidirectional pattern is combined in a second hybrid combiner with the figure eight pattern so that the sum and difference patterns are present at the outputs. These signals are fed to a processor which decodes the front/rear directional information. To decode left/right directional information, switches bypass both hybrid combiners and feed the first antennas basic cardioid patterns directly to the processor.

5 Claims, 6 Drawing Figures

RF PICKUP PATTERN

SUM HYBRID

SUM + DIFFERENCE HYBRID

ANTENNA PATTERN COMBINER

CROSS-REFERENCES TO RELATED APPLICATIONS

This combiner is used with Rear Window DF Antenna, application Ser. No. 802845, now U.S. Pat. No. 4,091,386 and with Mobile Directional Comparator, U.S. Pat. Ser. No. 4,025,924.

BACKGROUND OF THE INVENTION

The present invention relates to improvements in direction finding systems, in particular, homing type systems where there is an ambiguity in the direction of the bearing. This invention is to be used with a single plane antenna system. By combining and switching techniques, either of two sets of front-rear or right-left cardioid patterns can be produced at the outputs to feed a conventional two port directional finding system. With the addition of this invention bearing ambiguity is resolved.

DESCRIPTION OF THE PRIOR ART

In the field of direction finding receiving systems little has been done with switching and combining of single plane antennas to produce a four quadrant pattern. It has been general practice to employ a single homing antenna and make 90° turns after taking the first bearing to eliminate the 180° ambiguity. In an automobile this would mean waiting until the next intersection, which is time consuming. In an effort to improve their homing systems, some have mounted two homing antennas at right angles to each other, giving the desired result but with the problem of being conspicuous. Hybrid combiners such as U.S. Pat. by Dunlavy, U.S. Pat. No. 3,396,398 filed Aug. 25, 1964, as well as others, are directed at combining two similar structures to give a single pattern. Another U.S. Pat. by Brueckmann, U.S. Pat. No. 3,226,724 filed July 5, 1963, used four antennas with hybrid combiners yielding either omnidirectional or figure eight patterns at its output. These patterns while useful for direction finding do nothing to resolve the 180° ambiguity problem.

SUMMARY OF THE INVENTION

The object of this invention is to provide a means for switching or combining the outputs of a single plane antenna system to be used with a homing type processor such that the 180° ambiguity can be resolved. In the normal mode of operation the invention combines the basic cardioid patterns from a normal homing antenna system to form a circular RF pattern. This circular pattern is combined with the figure eight pattern of another antenna and their sums and differences taken simultaneously in a hybrid circuit. These sum and difference signals are two cardioid patterns which are in the direction of the original figure eight pattern. These two new patterns are processed by a normal homing type directional processor. In the second mode of operation the original two cardioid patterns, normally left and right, are passed by coaxial switches directly to the homing directional processor.

With appropriate antenna orientation, the first mode of operation shows whether the signal came from the front or rear with respect to the vehicle and how far with respect to the center line. The second mode shows whether the signal came from the left or right and how far with respect to the center line. Using both bits of information the direction of the transmitter can be determined with no 180° ambiguity. Since the special pattern needed for this combiner can be derived from a single plane, typically the rear window of the vehicle, there are no unsightly antennas on the top of the vehicle.

BRIEF DESCRIPTION OF THE DRAWING

The invention will be readily understood in light of the description of the illustrative embodiment of the present invention which follows. In the drawings which form part of the disclosure, like reference numerals refer to like elements.

DESCRIPTION OF THE PREFERRED EMBODIMENT

Figure 1:
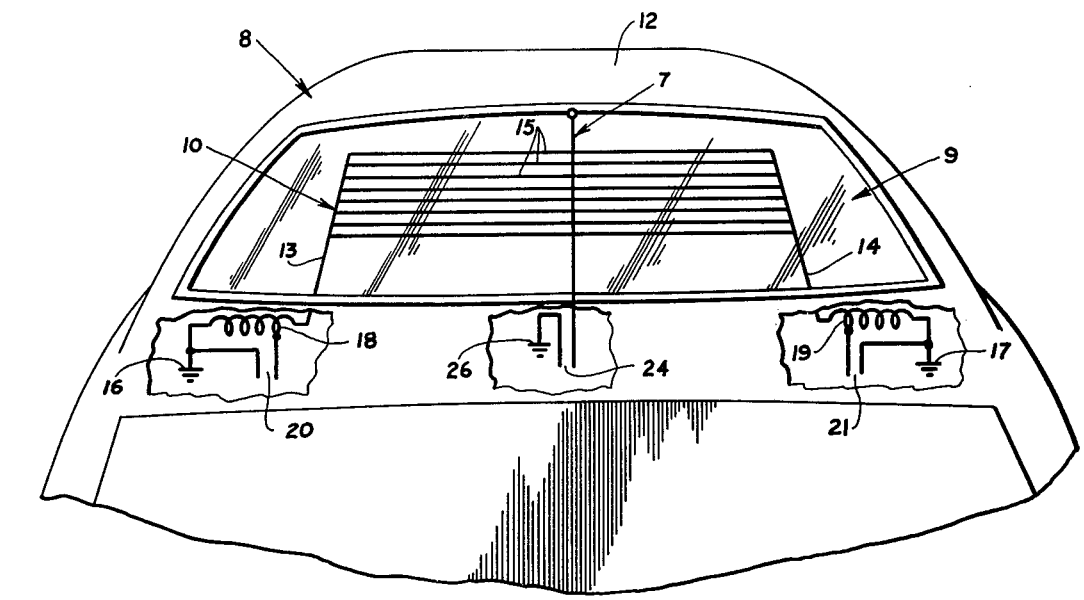
FIG. 1 illustrates a plane view of the feed antenna installed in a vehicle.

FIG. 1 illustrates the embodiment of the rear window DF antenna. This includes both antenna 7 which has a figure eight front-rear pattern and antenna 10 which has right-left cardioid patterns at its respective outputs. It is shown mounted in the rear window 9 of vehicle 8. The antenna 10 consists of vertical wire spaced whip elements 13 and 14 extending from the base portion of the window and a plurality of parallel wire horizontal cross connecting elements 15. The antenna 10 impedance is a function of the width of the wires, the number of wires, and their relationship to the vehicle split ground plane, and is essentially constant over a wide frequency range. Transformers 18 and 19 are used for optimum impedance matching. This reduces the structural mass considerably. To make the antenna inconspicuous a thin flat wire, typically 0.040 inch width, is selected for the horizontal wires. That leaves the number of horizontal wires to be selected a function of the relationship of the antenna to the split ground plane. Points 16, 17 and 26 are ground points to the vehicle body to establish ground plane for the antenna system and for the coaxial cable. Left and right vertical wire spaced whip elements 13 and 14 can either be connected through the 2-to-1 matching transformers 18 and 19 respectively to the outputs 20 and 21, or elements 13 and 14 could be connected directly to the outputs 20 and 21 with a corresponding 3 dB loss and a 2-to-1 increase in the SWR. A second antenna installed in the rear window consists of a vertical wire element which is insulated electrically from the first antenna. This element 7 bisects the window opening. The upper end portion of this wire element is attached at point 12 to the vehicle 8 and the lower end portion is the output 24.

Figure 2:
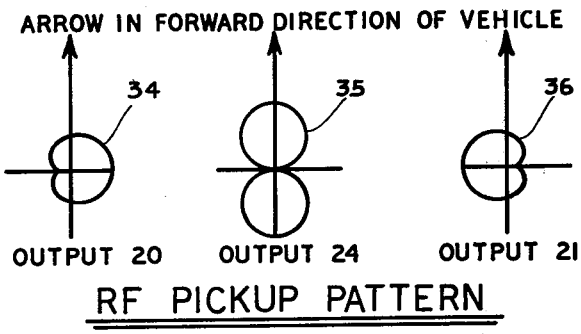
FIG. 2 illustrates the RF pattern of the antenna with respect to the vehicle heading.

In FIG. 2, the RF patterns of each of the outputs 20, 24, and 21 are shown in 34, 35, and 36 respectively. These patterns are drawn with respect to the vehicle for the incoming direction of the RF signal. These RF patterns have zero phase relationship and represent the absolute voltage of the signals and they also have a quadrature Azimuth relationship.

Figure 3:
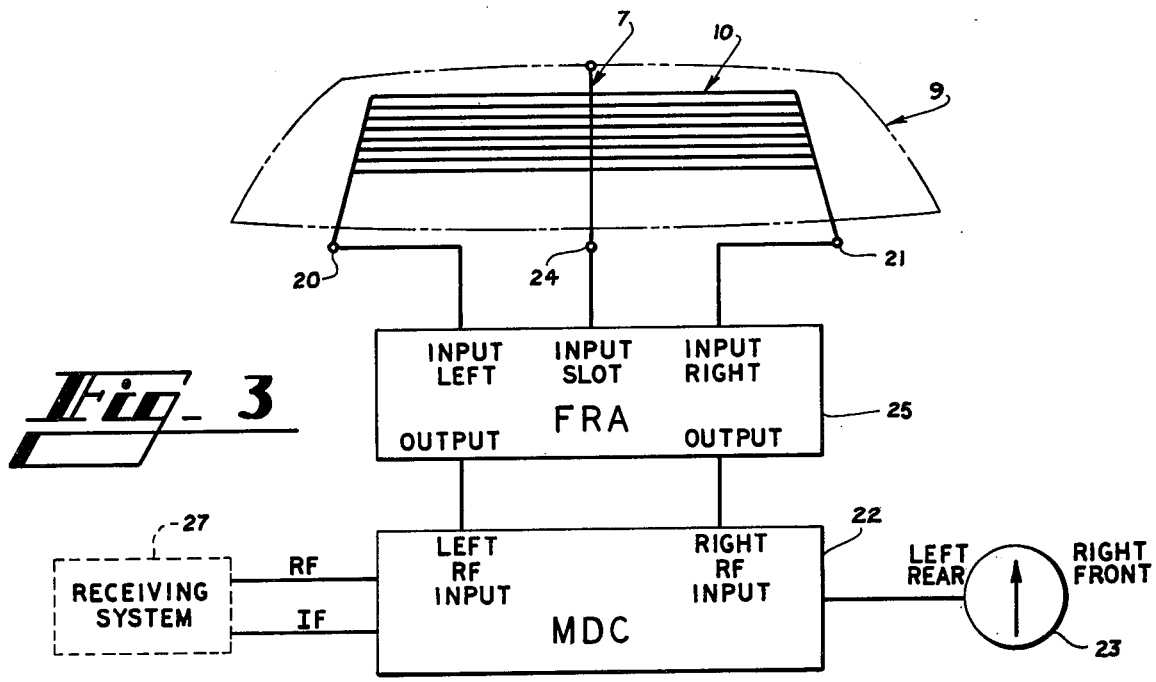
FIG. 3 illustrates the embodiment of the system.

FIG. 3 illustrates the operation of the direction finding system as a whole; the outputs 20, 21, and 24 of the antenna 7 and 10 are combined in the FRA 25 which selects the patterns-either right-left or front-rear. This directional information is then encoded by the Directional Comparator (MDC) 22. After encoding, the combined signal is fed to a receiver and the down converted Intermediate Frequency containing the directional information is returned to the MDC. After decoding the MDC drives meter 23 indicating the direction. For example, if the unknown RF source is to the right and to the front of vehicle 8 with the FRA 25 in the front-rear mode, the meter 23 will indicate front. The FRA 25 is then switched to the left-right mode and the meter 23 indicates right. With the use of this special DF antenna and FRA there is no 180° ambiguity, as in earlier homing systems.

Figure 4:
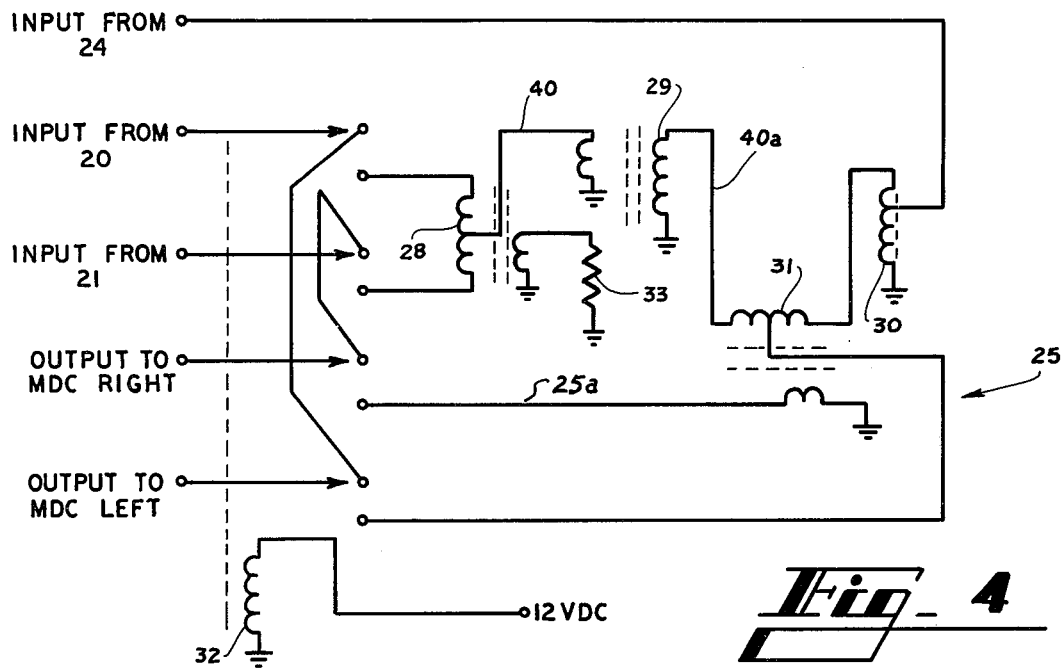
FIG. 4 illustrates the preferred embodiment of the invention.

In FIG. 4 the preferred embodiment of the invention is illustrated in detail, that is the FRA 25 of FIG. 3. The selection of mode of operation is made by a four-pole-double-throw relay 32. This selection of mode of operation or quadrature bearing display eliminates the 180° bearing ambiguity of the conventional homing system. The first mode of operation with the relay 32 energized is the front-rear mode. The cardioid ouputs 20 and 21, which are the right and left cardioid patterns, from antenna 10 are combined in a quadrature hybrid 28 to produce an omnidirectional RF pattern. The hybrid 28 sums the signals with minimal attenuation while providing good isolation between the input ports. A high degree of isolation (at least 20 dB) is required so that each antenna will receive independently from the others. Depending on the direction of incoming signal either antenna input 20 or 21 may have ten or twenty dB more signal strength than the other. The difference output is terminated in a resistive load 33 and is unused. The sum output 40 now at the 25 ohm impedance level must be transformed up in impedance for proper matching by a 4-to-1 transformer 29 to produce signal 40a at 100 ohm impedance level. Signal 40a, the sum of the two opposed cardioid RF signals, has a circular pattern with respect to the car orientation. By virtue of the mutual inductance between the internal windings of the hybrid and because of the phase relationship between these windings, the inputs are effectively isolated from each other and a constant impedance is presented at each input. The RF signal 24 from slot antenna 7 is transformed up in impedance by a 2-to-1 transformer 30. This RF signal from Transformer 30 and the sum signal 40a from Transformer 29 are now combined in a second quadrature hybrid 31. The sum signal 25 and the difference signal 25a are now fed through the relay 32 to the MDG 22 for processing. Since the phase and amplitude of signals are critical in this application, all connections are made either with coaxial cable and RF fittings, or strip lines on the printed circuit board. Any SWR, phase delay, or amplitude imbalance will reduce the directional sensitivity and, ultimately, the bandwidth of the system. The system installed in a normal automobile, properly terminated and balanced, will be frequency limited only by the input antenna.

Figure 5:
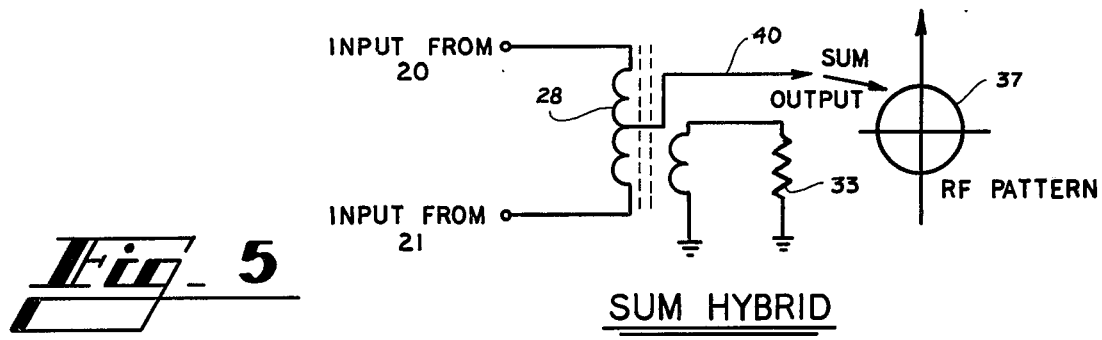
FIG. 5 illustrates the embodiment of the sum hybrid and the RF pattern at its output.

In FIG. 5 the embodiment of the sum hybrid 28 is shown in detail. The sum RF pattern 40 is shown 37 in circular form with respect to the car orientation.

It should be understood that the nature of the hybrid shown is not the subject of this invention, except in its overall relationship to the combining system as disclosed herein.

Figure 6:
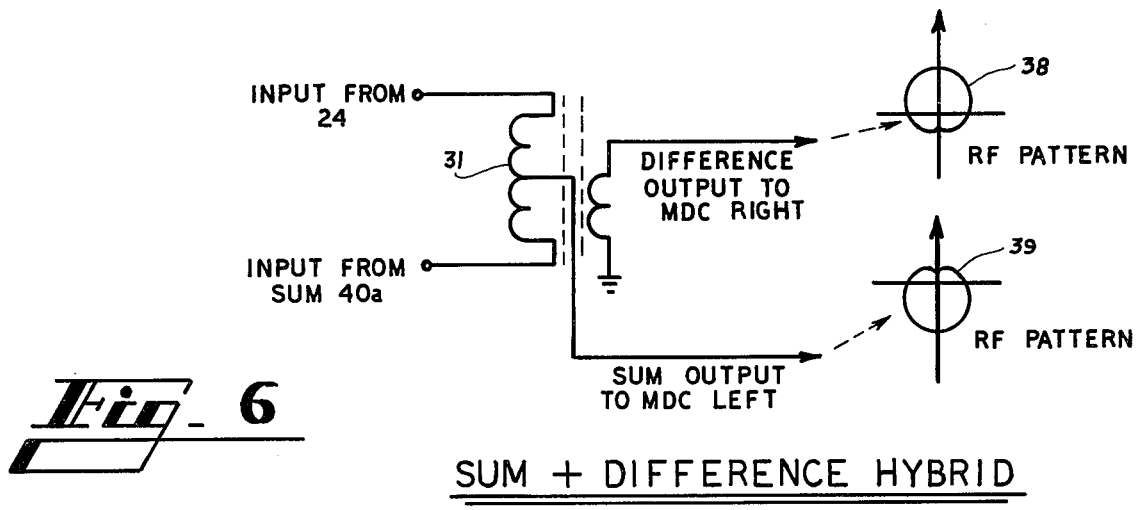
FIG. 6 illustrates the embodiment of the sum and difference hybrid and the RF pattern at its output.

In FIG. 6 the embodiment of the sum and difference hybrid 31 is shown in detail. The term hybrid as used herein is intended to signify those passive electrical networks of whatever form which are capable of mixing electrical input signals to obtain a combined output signal while maintaining a high degree of electrical isolation between the input signals. The RF pattern 38, which is the sum output, is a cardioid in the forward direction from the vehicle. The RF pattern 39, which is the difference output, is a cardioid in the rear direction from the vehicle.

Various modifications are contemplated and may obviously be resorted to by those skilled in the art without departing from the spirit and scope of the invention as herein defined by the appended claims, as only a preferred embodiment thereof has been disclosed. The RF relay may be replaced by a manual switch or a pin diode switch. Various types of hybrid combiners could be employed; for instance, the impedance transformer could be incorporated in the hybrid or a hybrid could be used that does not have a difference port. In fact, the matching transformers could be eliminated altogether, but his would increase the SWR and limit the bandwidth.

What is claimed is:

1. An antenna combiner comprising a left cardioid pattern antenna input, a right cardioid pattern antenna input, a means for combining said left and said right inputs into an omnidirectional pattern, a means for impedance matching said omnidirectional pattern, a third front-rear figure eight pattern antenna input, with means for matching said figure eight input, means for taking the sum and difference of the said omnidirectional patterns and said figure eight pattern with outputs for said sum and said difference, means for bypassing all combining means and passing the said left cardioid antenna input and said right cardioid antenna input to said sum output and said difference output respectively.

2. An antenna combiner as stated in claim 1 wherein said combining means is a quadrature hybrid combiner with the sum output producing the omnidirectional pattern and the difference output terminated in 50 ohms.

3. An antenna combiner as stated in claim 2 wherein said impedance matching means is a 4-to-1 wideband transformer for said omnidirectional pattern input and a 2-to-1 wideband transformer for said figure eight pattern input.

4. An antenna combiner as stated in claim 3 wherein sum and difference means is a quadrature hybrid combiner with both sum and difference ports available as outputs.

5. An antenna combiner as stated in claim 4 wherein means for bypassing is a 4 pole double throw switch with high isolation between each port.

* * * * *